US012106456B2

(12) United States Patent
Wang (10) Patent No.: US 12,106,456 B2
(45) Date of Patent: Oct. 1, 2024

(54) IMAGE CORRECTION METHOD, TERMINAL DEVICE AND STORAGE MEDIUM (71) Applicant: GUANGDONG OPPO MOBILE TELECOMMUNICATIONS CORP., LTD., Guangdong (CN)

(72) Inventor: Yun Wang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 377 days.

(21) Appl. No.: 17/744,101

(22) Filed: May 13, 2022

(65) Prior Publication Data
US 2022/0270219 A1 Aug. 25, 2022

Related U.S. Application Data (63) Continuation of application No. PCT/CN2020/129243, filed on Nov. 17, 2020.

(30) Foreign Application Priority Data

Dec. 9, 2019 (CN) .......................... 201911252839.3

(51) Int. Cl.
G06T 3/40 (2024.01)
G06T 5/80 (2024.01)
(Continued)

(52) U.S. Cl.
CPC .................. G06T 5/80 (2024.01); G06T 7/11 (2017.01); G06T 7/194 (2017.01); G06T 7/62 (2017.01);
(Continued)

(58) Field of Classification Search
CPC ........ A61B 5/18; G06N 3/0006; G06N 3/006; H04N 5/23238; G06K 9/6264; G06T 7/11;
(Continued)

(56) References Cited

U.S. PATENT DOCUMENTS

2003/0223622 A1* 12/2003 Simon .................. G06V 40/171
382/118
2011/0298936 A1 12/2011 Watanabe et al.
2014/0270544 A1* 9/2014 Chiang ..................... G06T 5/77
382/215
(Continued)

FOREIGN PATENT DOCUMENTS

CN 103391361 11/2013
CN 104994281 10/2015
(Continued)

OTHER PUBLICATIONS

WIPO, International Search Report and Written Opinion for PCT/CN2020/129243, Feb. 20, 2021.
(Continued)

Primary Examiner — Phuoc H Doan
(74) Attorney, Agent, or Firm — Hodgson Russ LLP (57) ABSTRACT An image correction method, a terminal device and a non-transitory computer readable storage medium are provided. The method includes: extracting human face attributes of an image; acquiring, from target regions, a first region having a human face correction attribute; acquiring, from the target regions, a second region having a human face protection attribute; and performing image correction on the human face in the first region, and performing pixel compensation, according to background pixels of the image, on a blank region generated by the image correction in the first region.

20 Claims, 4 Drawing Sheets (51) Int. Cl.
*G06T 7/11* (2017.01)
*G06T 7/194* (2017.01)
*G06T 7/62* (2017.01)
*G06V 10/75* (2022.01)
*G06V 40/16* (2022.01)

(52) U.S. Cl.
CPC .......... *G06V 10/759* (2022.01); *G06V 40/165* (2022.01); *G06T 2207/20021* (2013.01); *G06T 2207/30201* (2013.01)

(58) Field of Classification Search
CPC .... G06T 5/10; G06T 5/50; G06T 7/60; G06T 7/50; G06T 5/006; G06T 7/62; G06V 40/165
See application file for complete search history.

(56) References Cited

U.S. PATENT DOCUMENTS

| | | |
|---|---|---|
| 2014/0318430 A1 | 10/2014 | Kato et al. |
| 2016/0253791 A1 | 9/2016 | Kurata et al. |

FOREIGN PATENT DOCUMENTS

| | | |
|---|---|---|
| CN | 105554403 A | 5/2016 |
| CN | 105611142 | 5/2016 |
| CN | 104994281 B | 9/2017 |
| CN | 107451965 A | 12/2017 |
| CN | 107506693 | 12/2017 |
| CN | 110139033 | 8/2019 |
| CN | 110533729 | 12/2019 |
| CN | 111028169 | 4/2020 |
| WO | 2019216879 A1 | 11/2019 |

OTHER PUBLICATIONS

CNIPA, Second Office Action for CN Application No. 201911252839.3, Sep. 28, 2023.
CNIPA, First Office Action for CN Application No. 201911252839.3, Mar. 31, 2023.
EPO, Extended European Search Report for EP Application No. 20899659.5, Apr. 26, 2023.

* cited by examiner

IMAGE CORRECTION METHOD, TERMINAL DEVICE AND STORAGE MEDIUM

CROSS-REFERENCE TO RELATED APPLICATIONS

The present disclosure is a continuation of International Application No. PCT/CN2020/129243, filed on Nov. 17, 2020, which claims priority to Chinese Patent Application No. 201911252839.3, filed on Dec. 9, 2019, the entire disclosures of which are incorporated herein by reference.

TECHNICAL FIELD

The present disclosure relates to the field of image processing technologies, and in particular, to an image correction method, a terminal device and a storage medium.

BACKGROUND

At present, a terminal device is equipped with a wide-angle camera. An image captured by the wide-angle camera is always been distorted, and a distorted degree of the image is usually expressed by a distortion coefficient.

SUMMARY

The present disclosure proposes an image correction method, a terminal device and a storage medium.

In one aspect, an embodiment of the present disclosure provides an image correction method, the method includes: human face attributes of target regions of respective human faces in an image are extracted; a first region having a human face correction attribute is acquired from the target regions based on the human face attributes; a second region having a human face protection attribute is acquired from the target regions based on the human face attributes; and an image correction is performed on the human face in the first region, and a pixel compensation is performed, based on background pixels of the image, on a blank region generated by the image correction in the first region; the background pixels of the image do not include any pixel in the second region.

In another aspect, an embodiment of the present disclosure provides a terminal device, including a memory, a processor and a computer program stored in the memory and executable by the processor, the processor is configured, when executing the computer program, to realize the image correction method. The image correction method includes human face attributes of target regions of respective human faces in an image are extracted; a first region having a human face correction attribute is acquired from the target regions based on the human face attributes; a second region having a human face protection attribute is acquired from the target regions based on the human face attributes; and an image correction is performed on the human face in the first region; and a pixel compensation is performed, based on background pixels of the image, on a blank region generated by the image correction in the first region; the background pixels of the image are not any pixel in the second region.

In another aspect, an embodiment of the present disclosure provides a non-transitory computer readable storage medium stored with a computer program thereon, the computer program, when is executed by a processor, causes the processor to realize the image correction method. The image correction method includes: human face attributes of target regions of respective human faces in an image are extracted; a first region having a human face correction attribute is acquired from the target regions based on the human face attributes; a second region having a human face protection attribute is acquired from the target regions based on the human face attributes; and an image correction is performed on the human face in the first region; and a pixel compensation is performed, based on background pixels of the image, on a blank region generated by the image correction in the first region; the background pixels of the image are not any pixel in the second region.

The additional aspects and advantages of the present disclosure will be given in the following description, and some will become obvious from the following description, or learned through the practice of the present disclosure.

BRIEF DESCRIPTION OF THE DRAWINGS

The above and/or additional aspects and advantages of the present disclosure will become apparent and easy to understand from the following description of embodiments in combination with the accompanying drawings, wherein.

DETAILED DESCRIPTION OF EMBODIMENTS

Embodiments of the present disclosure are described in detail below, and examples of the embodiments are shown in the drawings, the same or similar reference numerals throughout represent the same or similar elements or elements with the same or similar functions. The embodiments described below with reference to the accompanying drawings are exemplary and are intended to explain the present disclosure and cannot be understood as limitations to the present disclosure.

Figure 1:
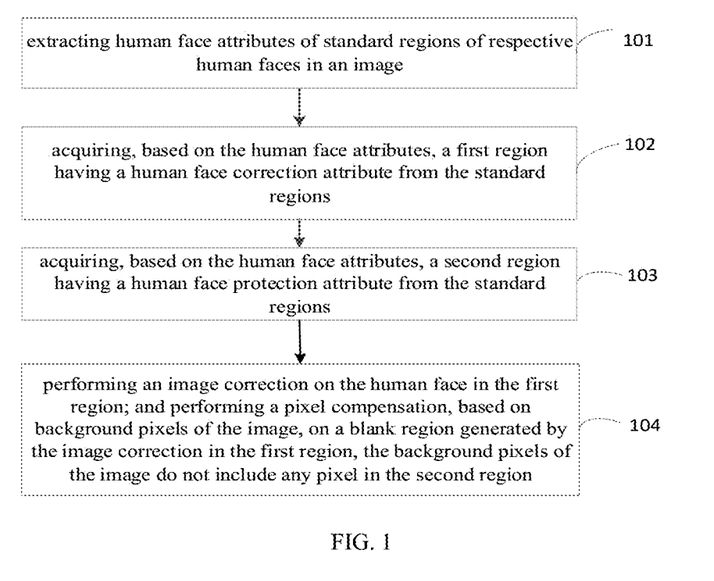
FIG. 1 illustrates a flowchart of an image correction method according to an embodiment of the present disclosure.

As shown in FIG. 1, an image correction method of an embodiment of the present disclosure includes:

extracting human face attributes of standard regions (also referred to target regions) of respective human faces in an image;

acquiring, based on the human face attributes, a first region having a human face correction attribute from the standard regions;

acquiring, based on the human face attributes, a second region having a human face protection attribute from the standard regions; and performing an image correction on the human face in the first region; and performing a pixel compensation, based on background pixels of the image, on a blank region generated by the image correction in the first region;

the background pixels of the image do not include any pixel in the second region.

In some illustrated embodiments, the extracting human face attributes of standard regions of respective human faces in an image, includes:

detecting human face frames (also referred to human face bounding box) of the respective human faces in the image, and demarcating, based on a preset algorithm, the standard regions of the human faces from the respective human face frames;

obtaining a human face area of each of the standard regions; and obtaining a human-face radial distance of each of the standard regions, from a central point coordinate of each of the human face frames to a central coordinate of the image.

Figure 2:
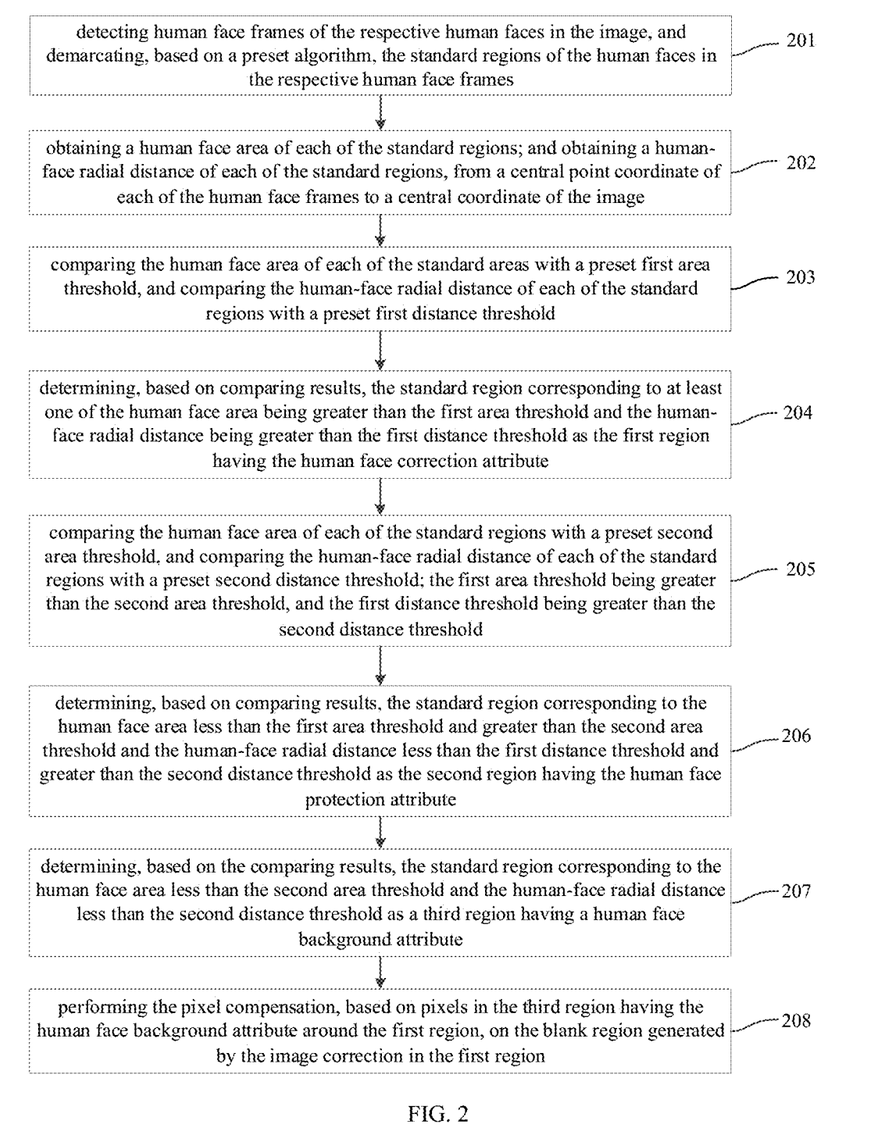
FIG. 2 illustrates a flowchart of an image correction method according to another embodiment of the present disclosure.

As shown in FIG. 2, in some illustrated embodiments, the acquiring, based on the human face attributes, a first region having a human face correction attribute from the standard regions, includes:

comparing the human face area of each of the standard regions with a preset first area threshold, and comparing the human-face radial distance of each of the standard regions with a preset first distance threshold; and determining, based on comparing results, the standard region corresponding to at least one of the human face area being greater than the first area threshold and the human-face radial distance being greater than the first distance threshold as the first region having the human face correction attribute.

In some illustrated embodiments, the acquiring, based on the human face attributes, a second region having a human face protection attribute from the standard regions, includes:

comparing the human face area of each of the standard regions with a preset second area threshold, and comparing the human-face radial distance of each of the standard regions with a preset second distance threshold, the first area threshold being greater than the second area threshold, and the first distance threshold being greater than the second distance threshold; and determining, based on comparing results, the standard region corresponding to the human face area less than the first area threshold and greater than the second area threshold, and the human-face radial distance less than the first distance threshold and greater than the second distance threshold as the second region having the human face protection attribute.

In some illustrated embodiments, the image correction method further includes: determining, based on the comparing results, the standard region corresponding to the human face area less than the second area threshold and the human-face radial distance less than the second distance threshold as a third region having a human face background attribute.

The performing a pixel compensation, based on background pixels of the image, on a blank region generated by the image correction in the first region, includes:

performing the pixel compensation, based on pixels in the third region having the human face background attribute around the first region, on the blank region generated by the image correction in the first region.

Figure 3:
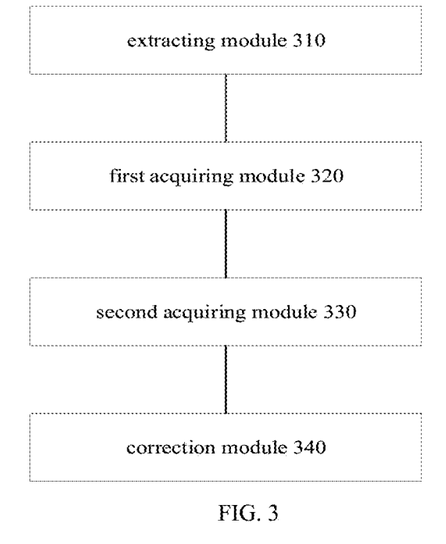
FIG. 3 illustrates a schematic structural view of an image correction apparatus according to an embodiment of the present disclosure.

As shown in FIG. 3, an image correction apparatus of an embodiment of the present disclosure includes an extracting module 310, a first acquiring module 320, a second acquiring module 330 and a correction module 340. The extracting module 310 is configured to extract human face attributes of standard regions of respective human faces in an image. The first acquiring module 320 is configured to acquire, based on the human face attributes, a first region having a human face correction attribute from the standard regions. The second acquiring module 330 is configured to acquire, based on the human face attributes, a second region having a human face protection attribute from the standard regions. The correction module 340 is configured to perform an image correction on the human face in the first region; and perform a pixel compensation, based on background pixels of the image, on a blank region generated by the image correction in the first region; the background pixels of the image are not any pixel in the second region.

Figure 4:
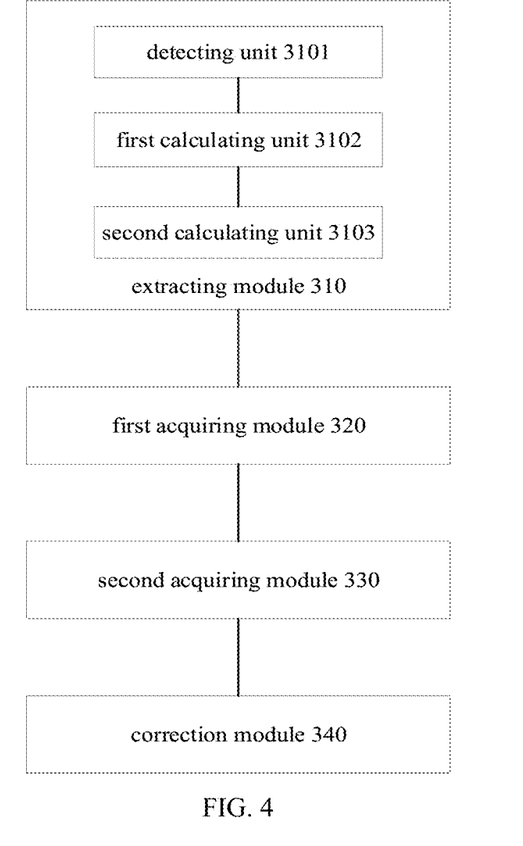
FIG. 4 illustrates a schematic structural view of an image correction apparatus according to another embodiment of the present disclosure.

As shown in FIG. 4, in some illustrated embodiments, the extracting module 310 includes: a detecting unit 3101, a first calculating unit 3102, and a second calculating unit 3103. The detecting unit 3101 is configured to detect human face frames of the respective human faces in the image, and demarcate, based on a preset algorithm, the standard regions of the human faces in the respective human face frames. The first calculating unit 3102 is configured to obtain a human face area of each of the standard regions. The second calculating unit 3103 is configured to obtain a human-face radial distance of each of the standard regions, from a central point coordinate of each of the human face frames to a central coordinate of the image.

In some illustrated embodiments, the first acquiring module 320 is configured concretely to: compare the human face area of each of the standard regions with a preset first area threshold, and compare the human-face radial distance of each of the standard regions with a preset first distance threshold; determine, based on compare results, the standard region corresponding to at least one of the human face area being greater than the first area threshold and the human-face radial distance being greater than the first distance threshold as the first region having the human face correction attribute.

In some illustrated embodiments, the second acquiring module 330 is configured concretely to: compare the human face area of each of the standard regions with a preset second area threshold, and compare the human-face radial distance of each of the standard regions with a preset second distance threshold; the first area threshold being greater than the second area threshold, and the first distance threshold being greater than the second distance threshold; determine, based on compare results, the standard region corresponding to the human face area less than the first area threshold and greater than the second area threshold and the human-face radial distance less than the first distance threshold and greater than the second distance threshold as the second region having the human face protection attribute.

In some illustrated embodiments, the standard region corresponding to the human face area less than the second area threshold and the human-face radial distance less than the second distance threshold is determined, based on the compare results, as a third region having a human face background attribute. The correction module 340 is configured concretely to: perform the pixel compensation, based on pixels in the third region having the human face background attribute around the first region, on the blank region generated by the image correction in the first region.

A terminal device of an embodiment of the present disclosure includes a memory, a processor and a computer program stored in the memory and executable by the processor. The processor is configured, when executing the computer program, to: extract human face attributes of standard regions of respective human faces in an image; acquire, based on the human face attributes, a first region having a human face correction attribute from the standard regions; acquire, based on the human face attributes, a second region having a human face protection attribute from the standard regions; and perform an image correction on the human face in the first region; and perform a pixel compensation, based on background pixels of the image, on a blank region generated by the image correction in the first region. The background pixels of the image are not any pixel in the second region.

In some illustrated embodiments, the processor is configured concretely, when executing the computer program, to: detect human face frames of the respective human faces in the image, and demarcate, based on a preset algorithm, the standard regions of the human faces in the respective human face frames; obtain a human face area of each of the standard regions; and obtain a human-face radial distance of each of the standard regions, from a central point coordinate of each of the human face frames to a central coordinate of the image.

In some illustrated embodiments, the processor is configured concretely, when executing the computer program, to: compare the human face area of each of the standard regions with a preset first area threshold, and compare the human-face radial distance of each of the standard regions with a preset first distance threshold; determine, based on compare results, the standard region corresponding to at least one of the human face area being greater than the first area threshold and the human-face radial distance being greater than the first distance threshold as the first region having the human face correction attribute.

In some illustrated embodiments, the processor is configured concretely, when executing the computer program, to: compare the human face area of each of the standard regions with a preset second area threshold, and compare the human-face radial distance of each of the standard regions with a preset second distance threshold; the first area threshold being greater than the second area threshold, and the first distance threshold being greater than the second distance threshold; determine, based on compare results, the standard region corresponding to the human face area less than the first area threshold and greater than the second area threshold and the human-face radial distance less than the first distance threshold and greater than the second distance threshold as the second region having the human face protection attribute.

In some illustrated embodiments, the processor is configured, when executing the computer program, to: determine, based on the compare results, the standard region corresponding to the human face area less than the second area threshold and the human-face radial distance less than the second distance threshold as a third region having a human face background attribute; perform the pixel compensation, based on pixels in the third region having the human face background attribute around the first region, on the blank region generated by the image correction in the first region.

An embodiment of the present disclosure provides a non-transitory computer readable storage medium stored with a computer program thereon, the computer program, when is executed by a processor, causes the processor to: extract human face attributes of standard regions of respective human faces in an image; acquire, based on the human face attributes, a first region having a human face correction attribute from the standard regions; acquire, based on the human face attributes, a second region having a human face protection attribute from the standard regions; and perform an image correction on the human face in the first region; and perform a pixel compensation, based on background pixels of the image, on a blank region generated by the image correction in the first region. The background pixels of the image are not any pixel in the second region.

In some illustrated embodiments, the computer program, when is executed by the processor, causes the processor to: detect human face frames of the respective human faces in the image, and demarcate, based on a preset algorithm, the standard regions of the human faces in the respective human face frames; obtain a human face area of each of the standard regions; and obtain a human-face radial distance of each of the standard regions, from a central point coordinate of each of the human face frames to a central coordinate of the image.

In some illustrated embodiments, the computer program, when is executed by the processor, causes the processor to: compare the human face area of each of the standard regions with a preset first area threshold, and compare the human-face radial distance of each of the standard regions with a preset first distance threshold; determine, based on compare results, the standard region corresponding to at least one of the human face area being greater than the first area threshold and the human-face radial distance being greater than the first distance threshold as the first region having the human face correction attribute.

In some illustrated embodiments, the computer program, when is executed by the processor, causes the processor to: compare the human face area of each of the standard regions with a preset second area threshold, and compare the human-face radial distance of each of the standard regions with a preset second distance threshold; the first area threshold being greater than the second area threshold, and the first distance threshold being greater than the second distance threshold; determine, based on compare results, the standard region corresponding to the human face area less than the first area threshold and greater than the second area threshold and the human-face radial distance less than the first distance threshold and greater than the second distance threshold as the second region having the human face protection attribute.

In some illustrated embodiments, the computer program, when is executed by the processor, causes the processor to: determine, based on the compare results, the standard region corresponding to the human face area less than the second area threshold and the human-face radial distance less than the second distance threshold as a third region having a human face background attribute; perform the pixel compensation, based on pixels in the third region having the human face background attribute around the first region, on the blank region generated by the image correction in the first region.

The image correction method and apparatus, terminal device and storage medium of the embodiments of the present disclosure are described below with reference to the accompanying drawings. An application subject of the image correction method of the embodiment of the present disclosure can be any terminal device with a camera.

In order to solve a technical problem that in a current terminal device, only one camera is calibrated with a set of distortion coefficients to obtain an image that needs distortion correction, and a global optimization method is used to de distort the image, which leads to correct a target object that does not need to be corrected, and thus affects a correction processing efficiency and a correction processing effect, the present disclosure provides an image correction method. In an embodiment of the present disclosure, human face attributes of standard regions corresponding to respective human faces in an image is extracted, a first region having a human face correction attribute is obtained from the standard regions based on the human face attributes, a second region having a human face protection attribute is obtained from the standard regions based on the human face attributes, and a human face in the first region is performed image correction, a blank region generated by the image correction in the first region is performed pixel compensation based on background pixels of the image, in which the background pixels of the image do not include any pixel in the second region. Therefore, the pixel compensation of the blank region generated by the image correction process is realized through the background pixels of the image, so as to improve the correction processing efficiency of the image and ensure the correction processing effect of the image.

An image correction method according to an embodiment of the present disclosure is described below with reference to the accompanying drawings.

FIG. 1 is a flowchart of an image correction method according to an embodiment of the present disclosure. As shown in FIG. 1, the method may begin from block 101 to block 104.

At block 101, extracting human face attributes of standard regions of respective human faces in an image.

Specifically, the image correction method of the present disclosure is mainly a correction for a distortion of a human face in the image. It can be understood that there can be one or more human faces in an actually captured image, and the human face can be a front face, a side face, a half face, etc. in the case of multiple human faces, the present disclosure can distinguish the multiple human faces into a human face requiring distortion correction, a human face requiring protection and not being processed as a background, as well as a human face that can be used as the background. During the correction, the human face requiring distortion correction can be processed and the human face requiring protection can be protected, which reduces unnecessary face correction and ensures that the face requiring protection will not be stretched and deformed.

The standard region refers to an accurate region of the human face, which can be selected and adjusted according to needs of a practical application. The human face attribute can include a human face area, and a distance between the human face and a center of the image (also referred to as human-face radial distance), etc.

It is understandable that there are many ways to obtain the standard region of the human face, for an example, directly obtaining the standard region of the human face through a human face detection algorithm, for another example, obtaining a human body region through an instance segmentation algorithm, and then obtaining a human face region from the human body region as the standard region of the human face, for still another example, a human face frame obtained by a human face detection algorithm and a human body region obtained by a instance segmentation algorithm can be superimposed to obtain the standard region of the human face. As a possible implementation, detecting human face frames of the respective human faces in the image, and demarcating, based on a preset algorithm, the standard regions of the human faces in the respective human face frames; obtaining a human face area of each standard region; and obtaining a human-face radial distance of each standard region, from a central point coordinate of each human face frame to a central coordinate of the image.

At block 102, acquiring, based on the human face attributes, a first region having a human face correction attribute from the standard regions.

At block 103, acquiring, based on the human face attributes a second region having a human face protection attribute from the standard regions.

It can be understood that each human face in the image has a corresponding standard region, the human face attribute of each standard region is extracted, a preset determination strategy is selected to determine each human face attribute, the standard region having the human face correction attribute can be obtained from the standard regions as the first region, and the standard region having the human face protection attribute can be obtained from the standard regions as the second region. The preset determination strategy can be selected and adjusted according to the needs of the practical application. The human face attribute may include the human face area and the distance between the human face and the center of the image, examples are as follows.

In a first example, the human face area is compared with a preset first area threshold, a human-face radial distance is compared with a preset first distance threshold, and the standard region corresponding to at least one of the human face area being greater than the first area threshold and the human-face radial distance being greater than the first distance threshold is determined, based on compare results, as the first region having the human face correction attribute.

In a second example, the human face area is compared with a preset second area threshold, and the human-face radial distance is compared with a preset second distance threshold, and the first area threshold is greater than the second area threshold, and the first distance threshold is greater than the second distance threshold, and the standard region corresponding to the human face area less than the first area threshold and greater than the second area threshold and the human-face radial distance less than the first distance threshold and greater than the second distance threshold is determined, based on compare results, as the second region having the human face protection attribute.

At block 104, performing an image correction on the human face in the first region; and performing a pixel compensation, based on background pixels of the image, on a blank region generated by the image correction in the first region. The background pixels of the image do not include any pixel in the second region.

In an illustrated embodiment, after determining the human face of the first region that needs de distortion correction and the human face of the second region that needs to be protected and not processed as the background, the human face of the first region is performed image correction, and the blank region generated by the image correction in the first region is performed the pixel compensation based on the background pixels of the image, the background pixels of the image do not include any pixel in the second region.

That is, in the process of image de distortion, the human face of the first region needs to be adjusted. After the adjustment, there will be the blank region, which needs to be processed by interpolation compensation. For example, after a human face with a circular in the first region is corrected to a human face with an ellipse, the black region is generated and is performed pixel compensation through the background pixel of the image excluding the pixels in the second region, which makes it possible to process the human face that need to be corrected and protect the human face that need to be protected during the distortion correction, reduces the unnecessary human face correction and avoids the stretching deformation of the protected human face as the background.

To sum up, the image correction method of the embodiment of the present disclosure extracts the human face attributes of the standard regions corresponding to the respective human faces in the image, obtains, based on the human face attributes, the first region having the human face correction attribute from the standard regions, obtains, based on the human face attributes, the second region having the human face protection attribute from the standard regions, performs image correction on the human face in the first region, and performs pixel compensation, based on the background pixels of the image, on the blank region generated by the image correction in the first region, the background pixels of the image do not include any pixel in the second region, which solves the technical problem of affecting a correction process efficiency and a correction process effect caused by correcting a target object that does not need to be corrected in the related art, realizes the pixel compensation for the blank region generated by the image correction through the background pixels of the image, improves the correction process efficiency of the image and ensures the correction process effect of the image.

In order to more clearly describe the above embodiment, it will be described in detail below in combination with FIG. 2. As shown in FIG. 2, the method may begin from block 201 to block 208.

At block 201, detecting human face frames of the respective human faces in the image, and demarcating, based on a preset algorithm, the standard regions of the human faces in the respective human face frames.

Specifically, the human face frames of the respective human faces can be obtained by detecting human faces of the image. In order to obtain the standard regions corresponding to the human faces, the standard regions of the human faces can be determined by preset algorithms such as entity segmentation or semantic segmentation combined with the human face frames.

For example, objects are separated from a background by the entity segmentation, and then pixels of the detected objects are extracted, and the detected objects are classified. In a general example, in the segmentation results, mask pixel values of non-human region are 0, and mask pixel values of different human regions correspond to different non-zero values respectively.

In an illustrated embodiment, the human face frame of each human face is obtained and determining whether there is an instance segmented human body region in the human face frame. If there is only an instance segmentation result of one human body region in the human face frame, a part corresponding the human body mask in the human face frame is found as the standard region of the human face; and if there are instance segmentation results of multiple human body regions in the human face frame, the segmentation result of the human body region with the largest region in the human face frame is taken as the standard region of the human face.

At block 202, obtaining a human face area of each of the standard regions; and obtaining a human-face radial distance of each of the standard regions, from a central point coordinate of each of the human face frames to a central coordinate of the image.

At block 203, comparing the human face area of each of the standard regions with a preset first area threshold, and comparing the human-face radial distance of each of the standard regions with a preset first distance threshold.

At block 204, determining, based on comparing results, the standard region corresponding to at least one of the human face area being greater than the first area threshold and the human-face radial distance being greater than the first distance threshold as the first region having the human face correction attribute.

At block 205, comparing the human face area of each of the standard regions with a preset second area threshold, and comparing the human-face radial distance of each of the standard regions with a preset second distance threshold; the first area threshold is greater than the second area threshold, and the first distance threshold is greater than the second distance threshold.

At block 206, determining, based on comparing results, the standard region corresponding to the human face area less than the first area threshold and greater than the second area threshold and the human-face radial distance less than the first distance threshold and greater than the second distance threshold as the second region having the human face protection attribute.

Specifically, firstly, the human face area of each standard region is obtained, such as an overlapping part of the human image region obtained by semantic segmentation or instance segmentation and the human face rectangle frame obtained by the face detection is obtained. Then the human-face radial distance from the central point coordinate of each human face frame to the central coordinate of the image is obtained. For example, the central point coordinate of the human face can be calculated according to coordinates of the four vertices of the human face frame obtained by face detection, and the human-face radial distance can be obtained by calculating a radial distance from the central point coordinate of the human face frame to the center of the image.

In an illustrated embodiment, in response to one of the human face area being greater than the first area threshold, the human-face radial distance being greater than the first distance threshold, and the human face area being greater than the first area threshold and the human-face radial distance being greater than the first distance threshold, the corresponding standard region is the first region having the human face correction attribute.

In response to the human face area is less than the first area threshold and greater than the second area threshold and the human-face radial distance is less than the first distance threshold and greater than the second distance threshold, the corresponding standard region is the second region having the human face protection attribute. The first area threshold is greater than the second area threshold, and the first distance threshold is greater than the second distance threshold. The first area threshold, the second area threshold, the first distance threshold and the second distance threshold can be selected and set according to the needs of practical application.

At block 207, determining, based on the comparing results, the standard region corresponding to the human face area less than the second area threshold and the human-face radial distance less than the second distance threshold as a third region having a human face background attribute.

At block 208, performing the pixel compensation, based on pixels in the third region having the human face background attribute around the first region, on the blank region generated by the image correction in the first region.

Specifically, it is determined that the standard region corresponding to the human face area less than the second area threshold and the human-face radial distance less than the second distance threshold is the third region having face background attribute, that is, the third area corresponding to the human face as the background.

It should be noted that a division mode of the first region, the second region and the third region can be selected and adjusted according to the specific application.

It should be noted that in the description of the above embodiment, if there is no instance segmentation result of the human body region in the human face frame, it is considered that the credibility of the human face frame is low, and the standard region corresponding to the human face is determined as the third region with the human face background attribute.

Thus, in the correction process, the human face requiring the distortion correction is corrected, the human face requiring protection is protected, the human face that can be used as the background is used as the background, and the pixel compensation is performed for the blank region generated by the image correction in the first region based on the pixels in the third region having the human face background attribute around the first region.

Therefore, by introducing the human face attributes, integrating the human face detection results and instance segmentation results, as well as each human face area size and each human-face radial distance, it can calculate whether each human face needs to be corrected, protected or used as the background, thereby each human face in the final correction result can get a better processing effect.

To sum up, the image correction method of the embodiment of the present disclosure detects the human face frame of each human face in the image, demarcates, based on the preset algorithm, the standard regions of the human faces from the human face frames, obtains the human face area of each standard region, obtains the human-face radial distance of each standard region from the central point coordinate of each human face frame to the central coordinate of the image, and compares the human face area with the first area threshold, and compares the human-face radial distance with the first distance threshold, determines, based on compare results, the standard region corresponding to the human face area greater than the first area threshold and/or the human-face radial distance greater than the first distance threshold as the first region having the human face correction attribute, determines, based on the compare results, the standard region corresponding to the human face area less than the first area threshold and greater than the second area threshold and the human-face radial distance less than the first distance threshold and greater than the second distance threshold as the second region having the human face protection attribute, determines, based on the compare results, the standard region corresponding to the human face area less than the second area threshold and the human-face radial distance less than the second distance threshold as the third region having the human face background attribute, and performs the pixel compensation, based on the pixels in the third region having the human face background attribute around the first region, on the blank region generated by the image correction in the first region, which solves the technical problems that in the related art, the distortion of different regions on the image cannot be accurately obtained, and the correction processing efficiency and correction processing effect are affected by correcting the target object that does not need to be corrected, and realizes different processing according to the specific distortion of different regions of the image, the pixels in the third region having the human face background attribute around the first region are used to compensate the blank region generated by the image correction in the first region, thereby to improve the correction process efficiency of image and ensure the de distortion process effect.

In order to realize the above embodiment, the present disclosure further provides an image correction apparatus. FIG. 3 illustrates a schematic structural view of an image correction apparatus according to an embodiment of the present disclosure. As shown in FIG. 3, the image correction apparatus may include an extracting module 310, a first acquiring module 320, a second acquiring module 330 and a correction module 340.

The extracting module 310 is configured to extract human face attributes of standard regions of respective human faces in an image.

The first acquiring module 320 is configured to acquire, based on the human face attributes, a first region having a human face correction attribute from the standard regions.

The second acquiring module 330 is configured to acquire, based on the human face attributes, a second region having a human face protection attribute from the standard regions.

The correction module 340 is configured to perform an image correction on the human face in the first region, and perform a pixel compensation, based on background pixels of the image, on a blank region generated by the image correction in the first region. The background pixels of the image are not any pixel in the second region.

In an illustrated embodiment, as shown in FIG. 4, on the basis of FIG. 3, the extracting module 310 may include: a detecting unit 3101, a first calculating unit 3102, and a second calculating unit 3103.

The detecting unit 3101 is configured to detect human face frames of the respective human faces in the image, and demarcate, based on a preset algorithm, the standard regions of the human faces in the respective human face frames.

The first calculating unit 3102 is configured to obtain a human face area of each of the standard regions.

The second calculating unit 3103 is configured to obtain a human-face radial distance of each of the standard regions, from a central point coordinate of each of the human face frames to a central coordinate of the image.

In an illustrated embodiment, the first acquiring module 320 is configured concretely to: compare the human face area of each of the standard regions with a preset first area threshold, and compare the human-face radial distance of each of the standard regions with a preset first distance threshold; and determine, based on compare results, the standard region corresponding to at least one of the human face area being greater than the first area threshold and the human-face radial distance being greater than the first distance threshold as the first region having the human face correction attribute.

In an illustrated embodiment, the second acquiring module 330 is configured concretely to: compare the human face area of each of the standard regions with a preset second area threshold, and compare the human-face radial distance of each of the standard regions with a preset second distance threshold; the first area threshold being greater than the second area threshold, and the first distance threshold being greater than the second distance threshold; and determine, based on compare results, the standard region corresponding to the human face area less than the first area threshold and greater than the second area threshold and the human-face radial distance less than the first distance threshold and greater than the second distance threshold as the second region having the human face protection attribute.

In an illustrated embodiment, the standard region corresponding to the human face area less than the second area threshold and the human-face radial distance less than the second distance threshold is determined, based on the compare results, as a third region having a human face background attribute. The correction module 340 is configured concretely to: perform the pixel compensation, based on pixels in the third region having the human face background attribute around the first region, on the blank region generated by the image correction in the first region.

It should be noted that the above description of the image correction method is also applicable to the image correction apparatus of the embodiment of the present disclosure. Its implementation principle is similar and will not be repeated here.

To sum up, the image correction apparatus of the embodiment of the present disclosure extracts the human face attributes of the standard regions corresponding to the respective human faces in the image, obtains, based on the human face attributes, the first region having the human face correction attribute from the standard regions, obtains, based on the human face attributes, the second region having the human face protection attribute from the standard regions, performs image correction on the human face in the first region; and performs pixel compensation, based on the background pixels of the image, on the blank region generated by the image correction in the first region, the background pixels of the image are not any pixel in the second region, which solves the technical problem of affecting a correction process efficiency and a correction process effect caused by correcting a target object that does not need to be corrected in the related art, realizes the pixel compensation for the blank region generated by the image correction process through the background pixels of the image, improves the correction process efficiency of the image and ensures the correction process effect of the image.

In order to realize the above embodiment, the present disclosure further provides a terminal device, including: a memory, a processor, and a computer program stored in the memory and executable by the processor. the processor is configured, when executing the computer program, to realize the image correction method described in the above embodiment.

In order to realize the above embodiments, the present disclosure further provides a non-transitory computer readable storage medium stored with a computer program thereon. The computer program, when is executed by a processor, causes the processor to realize the image correction method described in the above embodiments.

Reference throughout this specification to "an embodiment", "some embodiments", "an example", "a specific example" or "some examples" means that particular features, structures, materials, or characteristics described in connection with the embodiments or examples are included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art can compose or combine the different embodiments or examples described in this specification and the features of different embodiments or examples.

In addition, terms such as "first" and "second" are used herein for purposes of description and are not intended to indicate or imply relative importance or significance or to imply the number of indicated technical features. Thus, a feature defined as "first" and "second" may comprise one or more of this feature. In the description of the present disclosure, "multiple" means "two or more than two", unless otherwise specified.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which it should be understood by those skilled in the art that functions may be implemented in a sequence other than the sequences shown or discussed, including in a substantially identical sequence or in an opposite sequence.

The logic and/or step described in other manners herein or shown in the flow chart, for example, a particular sequence table of executable instructions for realizing the logical function, may be specifically achieved in any computer readable medium to be used by the instructions execution system, device or equipment (such as a system based on computers, a system comprising processors or other systems capable of obtaining instructions from the instructions execution system, device and equipment executing the instructions), or to be used in combination with the instructions execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random-access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instructions execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although embodiments of the present disclosure have been shown and described, it would be appreciated by those skilled in the art that the embodiments are explanatory and cannot be construed to limit the present disclosure, and changes, modifications, alternatives and variations can be made in the embodiments without departing from the scope of the present disclosure.

What is claimed is:

1. An image correction method, comprising:
   extracting human face attributes of target regions of respective human faces in an image;
   acquiring, based on the human face attributes, a first region having a human face correction attribute from the target regions;
   acquiring, based on the human face attributes, a second region having a human face protection attribute from the target regions; and
   performing an image correction on the human face in the first region; and
   performing a pixel compensation, based on background pixels of the image, on a blank region generated by the image correction in the first region;
   wherein the background pixels of the image do not comprise any pixel in the second region.

2. The method according to claim 1, wherein the extracting human face attributes of target regions of respective human faces in an image, comprises:
   detecting human face frames of the respective human faces in the image; and demarcating, based on a preset algorithm, the target regions of the human faces from the respective human face frames;
   obtaining a human face area of each of the target regions; and
   obtaining a human-face radial distance of each of the target regions, from a central point coordinate of each of the human face frames to a central coordinate of the image.

3. The method according to claim 2, wherein the acquiring, based on the human face attributes, a first region having a human face correction attribute from the target regions, comprises:
   comparing the human face area of each of the target regions with a preset first area threshold, and comparing the human-face radial distance of each of the target regions with a preset first distance threshold; and
   determining, based on comparing results, the target region corresponding to at least one of the human face area being greater than the first area threshold and the human-face radial distance being greater than the first distance threshold as the first region having the human face correction attribute.

4. The method according to claim 3, wherein the acquiring, based on the human face attributes, a second region having a human face protection attribute from the target regions, comprises:
   comparing the human face area of each of the target regions with a present second area threshold, and comparing the human-face radial distance of each of the target regions with a present second distance threshold, wherein the first area threshold is greater than the second area threshold, and the first distance threshold is greater than the second distance threshold; and
   determining, based on comparing results, the target region corresponding to the human face area less than the first area threshold and greater than the second area threshold and the human-face radial distance less than the first distance threshold and greater than the second distance threshold as the second region having the human face protection attribute.

5. The method according to claim 4, further comprising:
   determining, based on the comparing results, the target region corresponding to the human face area less than the second area threshold and the human-face radial distance less than the second distance threshold as a third region having a human face background attribute;
   wherein the performing a pixel compensation, based on background pixels of the image, on a blank region generated by the image correction in the first region, comprises:
   performing the pixel compensation, based on pixels in the third region having the human face background attribute around the first region, on the blank region generated by the image correction in the first region.

6. The method according to claim 1, wherein each of the human face attributes comprises a human face area and a human-face radial distance;
   wherein the acquiring, based on the human face attributes, a first region having a human face correction attribute from the target regions, comprises:
   comparing the human face area of each of the target regions with a preset first area threshold, and comparing the human-face radial distance of each of the target regions with a preset first distance threshold; and
   determining, based on comparing results, the target region corresponding to at least one of the human face area being greater than the first area threshold and the human-face radial distance being greater than the first distance threshold as the first region having the human face correction attribute; and
   wherein the acquiring, based on the human face attributes, a second region having a human face protection attribute from the target regions, comprises:
   comparing the human face area of each of the target regions with a present second area threshold, and comparing the human-face radial distance of each of the target regions with a present second distance threshold, wherein the first area threshold is greater than the second area threshold, and the first distance threshold is greater than the second distance threshold; and
   determining, based on comparing results, the target region corresponding to the human face area less than the first area threshold and greater than the second area threshold and the human-face radial distance less than the first distance threshold and greater than the second distance threshold as the second region having the human face protection attribute.

7. The method according to claim 6, further comprising:
   determining, based on the comparing results, the target region corresponding to the human face area less than the second area threshold and the human-face radial distance less than the second distance threshold as a third region having a human face background attribute;

wherein the performing a pixel compensation, based on background pixels of the image, on a blank region generated by the image correction in the first region, comprises:
  performing the pixel compensation, based on pixels in the third region having the human face background attribute around the first region, on the blank region generated by the image correction in the first region.

8. A terminal device, comprising: a memory, a processor, and a computer program stored in the memory and executable by the processor, wherein the processor is configured, when executing the computer program, to:
  extract human face attributes of target regions of respective human faces in an image;
  acquire, based on the human face attributes, a first region having a human face correction attribute from the target regions;
  acquire, based on the human face attributes, a second region with a human face protection attribute from the target regions; and
  perform an image correction on a human face in the first region; and perform a pixel compensation, based on background pixels of the image, on a blank region generated by the image correction in the first region;
  wherein the background pixels of the image are not any pixel in the second region.

9. The terminal device according to claim 8, wherein the processor is configured concretely, when executing the computer program, to:
  detect human face frames of the respective human faces in the image, and demarcate, based on a preset algorithm, the target regions of the human faces in the human face frames;
  obtain a human face area of each of the target regions; and
  obtain a human-face radial distance of each of the target regions, from a central point coordinate of each of the human face frames to a central coordinate of the image.

10. The terminal device according to claim 9, wherein the processor is configured concretely, when executing the computer program, to:
  compare the human face area of each of the target regions with a preset first area threshold, and compare the human-face radial distance of each of the target regions with a preset first distance threshold; and
  determine, based on compare results, the target region corresponding to at least one of the human face area being greater than the first area threshold and the human-face radial distance being greater than the first distance threshold as the first region having the human face correction attribute.

11. The terminal device according to claim 10, wherein the processor is configured concretely, when executing the computer program, to:
  compare the human face area of each of the target regions with a present second area threshold, and compare the human-face radial distance of each of the target regions with a present second distance threshold; wherein the first area threshold is greater than the second area threshold, and the first distance threshold is greater than the second distance threshold; and
  determine, based on compare results, the target region corresponding to the human face area less than the first area threshold and greater than the second area threshold and the human-face radial distance less than the first distance threshold and greater than the second distance threshold as the second region having the human face protection attribute.

12. The terminal device according to claim 11, wherein the processor is configured, when executing the computer program, to:
  determine, based on the compare results, the target region corresponding to the human face area less than the second area threshold and the human-face radial distance less than the second distance threshold as a third region having a human face background attribute; and
  perform the pixel compensation, based on pixels in the third region having the human face background attribute around the first region, on the blank region generated by the image correction in the first region.

13. The terminal device according to claim 8, wherein each of the human face attributes comprises a human face area and a human-face radial distance;
  wherein the processor is configured concretely, when executing the computer program, to:
    compare the human face area of each of the target regions with a preset first area threshold, compare the human-face radial distance of each of the target regions with a preset first distance threshold, compare the human face area of each of the target regions with a present second area threshold, and compare the human-face radial distance of each of the target regions with a present second distance threshold, wherein the first area threshold is greater than the second area threshold, and the first distance threshold is greater than the second distance threshold;
    determine, based on compare results, the target region corresponding to at least one of the human face area being greater than the first area threshold and the human-face radial distance being greater than the first distance threshold as the first region having the human face correction attribute; and
    determine, based on compare results, the target region corresponding to the human face area less than the first area threshold and greater than the second area threshold and the human-face radial distance less than the first distance threshold and greater than the second distance threshold as the second region having the human face protection attribute.

14. The terminal device according to claim 13, wherein the processor is configured, when executing the computer program, to:
  determine, based on compare results, the target region corresponding to the human face area less than the second area threshold and the human-face radial distance less than the second distance threshold as a third region having a human face background attribute; and
  perform the pixel compensation, based on pixels in the third region having the human face background attribute around the first region, on the blank region generated by the image correction in the first region.

15. A non-transitory computer readable storage medium stored with a computer program thereon, wherein the computer program, when is executed by a processor, causes the processor to:
  extract human face attributes of target regions of respective human faces in an image;
  acquire, based on the human face attributes, a first region having a human face correction attribute from the target regions;
  acquire, based on the human face attributes, a second region having a human face protection attribute from the target regions; and
  perform an image correction on a human face in the first region, and perform a pixel compensation, based on background pixels of the image, on a blank region generated by the image correction in the first region;

wherein the background pixels of the image are not any pixel in the second region.

16. The non-transitory computer readable storage medium according to claim 15, wherein the computer program, when is executed by the processor, causes the processor to:

detect human face frames of the respective human faces in the image, and demarcate, based on a preset algorithm, the target regions of the human faces in the respective human face frames;

obtain a human face area of each of the target regions; and obtain a human-face radial distance of each of the target regions, from a central point coordinate of each of the human face frames to a central coordinate of the image.

17. The non-transitory computer readable storage medium according to claim 16, wherein the computer program, when is executed by the processor, causes the processor to:

compare the human face area of each of the target regions with a present first area threshold, and compare the human-face radial distance of each of the target regions with a present first distance threshold; and determine, based on compare results, the target region corresponding to at least one of the human face area being greater than the first area threshold and the human-face radial distance being greater than the first distance threshold as the first region having the human face correction attribute.

18. The non-transitory computer readable storage medium according to claim 17, wherein the computer program, when is executed by the processor, causes the processor to:

compare the human face area of each of the target regions with a present second area threshold, and compare the human-face radial distance of each of the target regions with a present second distance threshold; wherein the first area threshold is greater than the second area threshold, and the first distance threshold is greater than the second distance threshold; and determine, based on compare results, the target region corresponding to the human face area less than the first area threshold and greater than the second area threshold and the human-face radial distance less than the first distance threshold and greater than the second distance threshold as the second region having the human face protection attribute.

19. The non-transitory computer readable storage medium according to claim 18, wherein the computer program, when is executed by the processor, causes the processor to:

determine, based on the compare results, the target region corresponding to the human face area less than the second area threshold and the human-face radial distance less than the second distance threshold as a third region having a human face background attribute; and perform the pixel compensation, based on pixels in the third region having the human face background attribute around the first region, on the blank region generated by the image correction in the first region.

20. The non-transitory computer readable storage medium according to claim 15, wherein each of the human face attributes comprises a human face area and a human-face radial distance;

wherein the computer program, when is executed by the processor, causes the processor to:

compare the human face area of each of the target regions with a preset first area threshold, compare the human-face radial distance of each of the target regions with a preset first distance threshold, compare the human face area of each of the target regions with a present second area threshold, and compare the human-face radial distance of each of the target regions with a present second distance threshold, wherein the first area threshold is greater than the second area threshold, and the first distance threshold is greater than the second distance threshold;

determine, based on compare results, the target region corresponding to at least one of the human face area being greater than the first area threshold and the human-face radial distance being greater than the first distance threshold as the first region having the human face correction attribute; and determine, based on compare results, the target region corresponding to the human face area less than the first area threshold and greater than the second area threshold and the human-face radial distance less than the first distance threshold and greater than the second distance threshold as the second region having the human face protection attribute.

* * * * *